(12) United States Patent
Jeon

(10) Patent No.: US 12,090,892 B2
(45) Date of Patent: Sep. 17, 2024

(54) BRAKE APPARATUS AND METHOD FOR CONTROLLING SAME

(71) Applicant: HL MANDO CORPORATION, Pyeongtaek-si (KR)

(72) Inventor: Nam Ju Jeon, Seoul (KR)

(73) Assignee: HL MANDO CORPORATION, Pyeongtaek (KR)

( * ) Notice: Subject to any disclaimer, the term of this patent is extended or adjusted under 35 U.S.C. 154(b) by 394 days.

(21) Appl. No.: 17/609,209

(22) PCT Filed: May 7, 2020

(86) PCT No.: PCT/KR2020/006051
§ 371 (c)(1),
(2) Date: Nov. 5, 2021

(87) PCT Pub. No.: WO2020/226443
PCT Pub. Date: Nov. 12, 2020

(65) Prior Publication Data
US 2022/0203840 A1 Jun. 30, 2022

(30) Foreign Application Priority Data
May 7, 2019 (KR) ........................ 10-2019-0052913

(51) Int. Cl.
*B60L 7/26* (2006.01)
*B60T 13/16* (2006.01)
(Continued)

(52) U.S. Cl.
CPC .............. *B60L 7/26* (2013.01); *B60T 13/165* (2013.01); *B60T 13/686* (2013.01); *B60L 7/18* (2013.01);
(Continued)

(58) Field of Classification Search
CPC . B60L 7/18; B60L 7/26; B60T 13/165; B60T 13/686; B60T 13/586;
(Continued)

(56) References Cited

U.S. PATENT DOCUMENTS 5,853,229 A 12/1998 Willmann et al.
8,075,066 B2 * 12/2011 Greer .................... B60T 8/5093
303/157

(Continued)

FOREIGN PATENT DOCUMENTS

| JP | 2009-202678 A | 9/2009 |
|---|---|---|
| JP | 2014-113972 A | 6/2014 |

(Continued)

OTHER PUBLICATIONS

Office Action issued May 30, 2023 for counterpart Korean Patent Application No. 10-2021-7038603 (See English Translation).

(Continued)

*Primary Examiner* — Thomas J Williams
(74) *Attorney, Agent, or Firm* — Harvest IP Law, LLP

(57) ABSTRACT

Disclosed is a brake apparatus capable of minimizing the stress of valves. The brake apparatus comprises: a first wheel cylinder provided in a first wheel; a second wheel cylinder provided in a second wheel; a first outlet valve for controlling discharge of brake oil from the first wheel cylinder; a second outlet valve for controlling discharge of the brake oil from the second wheel cylinder; and a controller which opens and then closes one of the first and second outlet valves in response to a first braking command generated when a brake pedal deviates from a standard position, and opens and then closes the other outlet valve of the first and second outlet valves in response to a first brake suspending command generated when the brake pedal is restored to the standard position.

17 Claims, 13 Drawing Sheets

(51) Int. Cl.
*B60T 13/68* (2006.01)
*B60L 7/18* (2006.01)
*B60T 13/58* (2006.01)

(52) U.S. Cl.
CPC ......... *B60T 13/586* (2013.01); *B60T 2220/04* (2013.01); *B60T 2240/00* (2013.01); *B60T 2270/60* (2013.01); *B60T 2270/604* (2013.01); *B60T 2270/82* (2013.01)

(58) Field of Classification Search
CPC ............. B60T 2220/04; B60T 2240/00; B60T 2270/60; B60T 2270/604; B60T 2270/82
See application file for complete search history.

(56) References Cited

U.S. PATENT DOCUMENTS

| | | | | |
|---|---|---|---|---|
| 9,776,515 | B2* | 10/2017 | Kunz | B60T 8/4072 |
| 2014/0062176 | A1* | 3/2014 | Nishida | B60T 8/4872 |
| | | | | 303/3 |
| 2022/0203840 | A1* | 6/2022 | Jeon | B60L 50/16 |

FOREIGN PATENT DOCUMENTS

| KR | 10-1371898 B1 | 3/2014 |
|---|---|---|
| KR | 10-2015-0028331 A | 3/2015 |

OTHER PUBLICATIONS

International Search Report (PCT/ISA/210) issued in PCT Application No. PCT/KR2020/006051 dated Sep. 1, 2020 with English Translation.
Written Opinion (PCT/ISA/237) issued in PCT Application No. PCT/KR2020/006051 dated Sep. 1, 2020.

* cited by examiner

[FIG. 1]
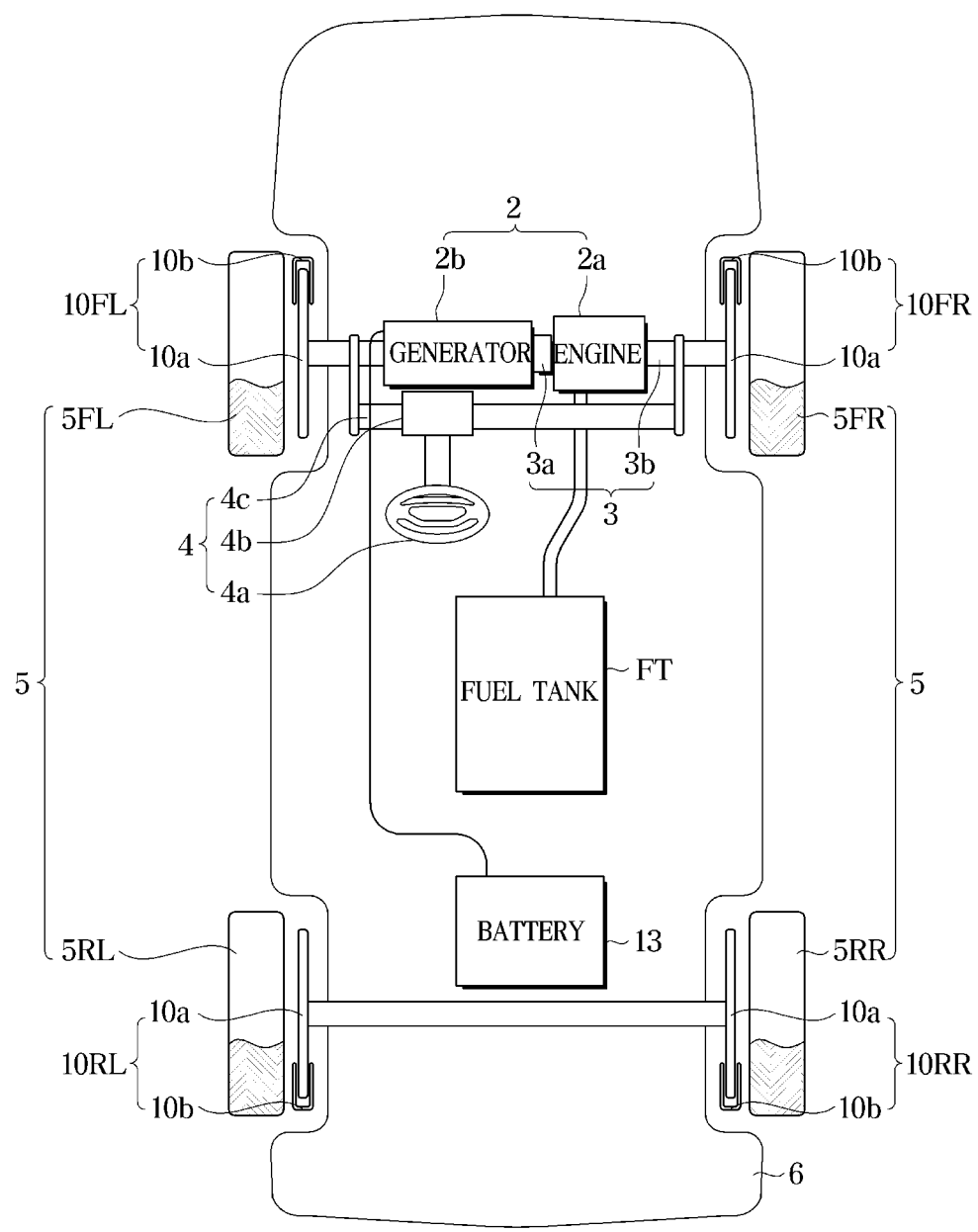

[FIG.2]
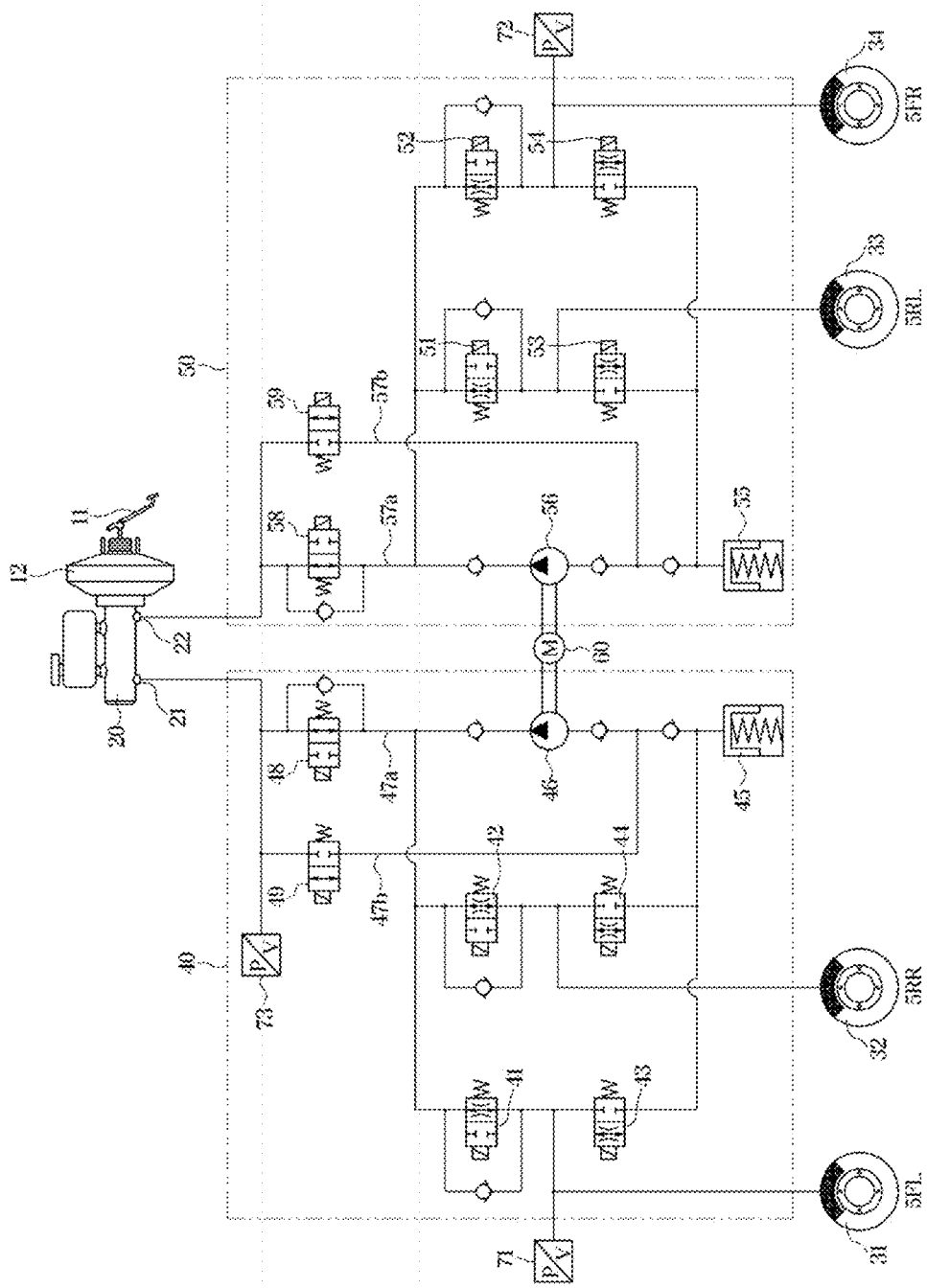

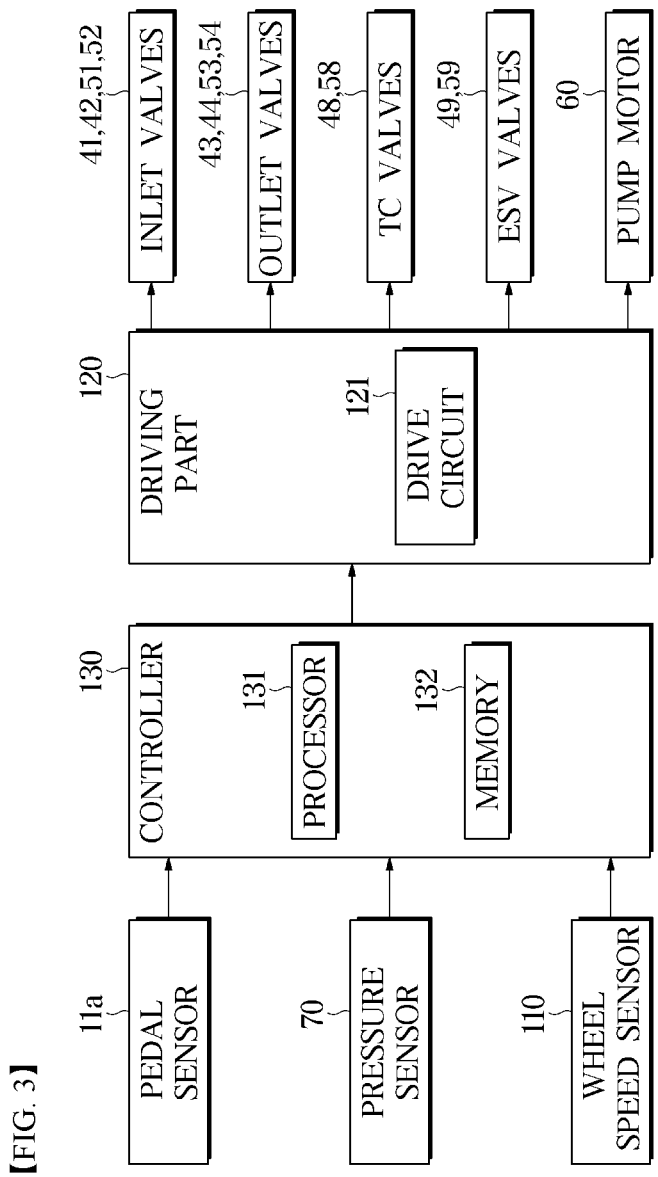
[FIG. 3]

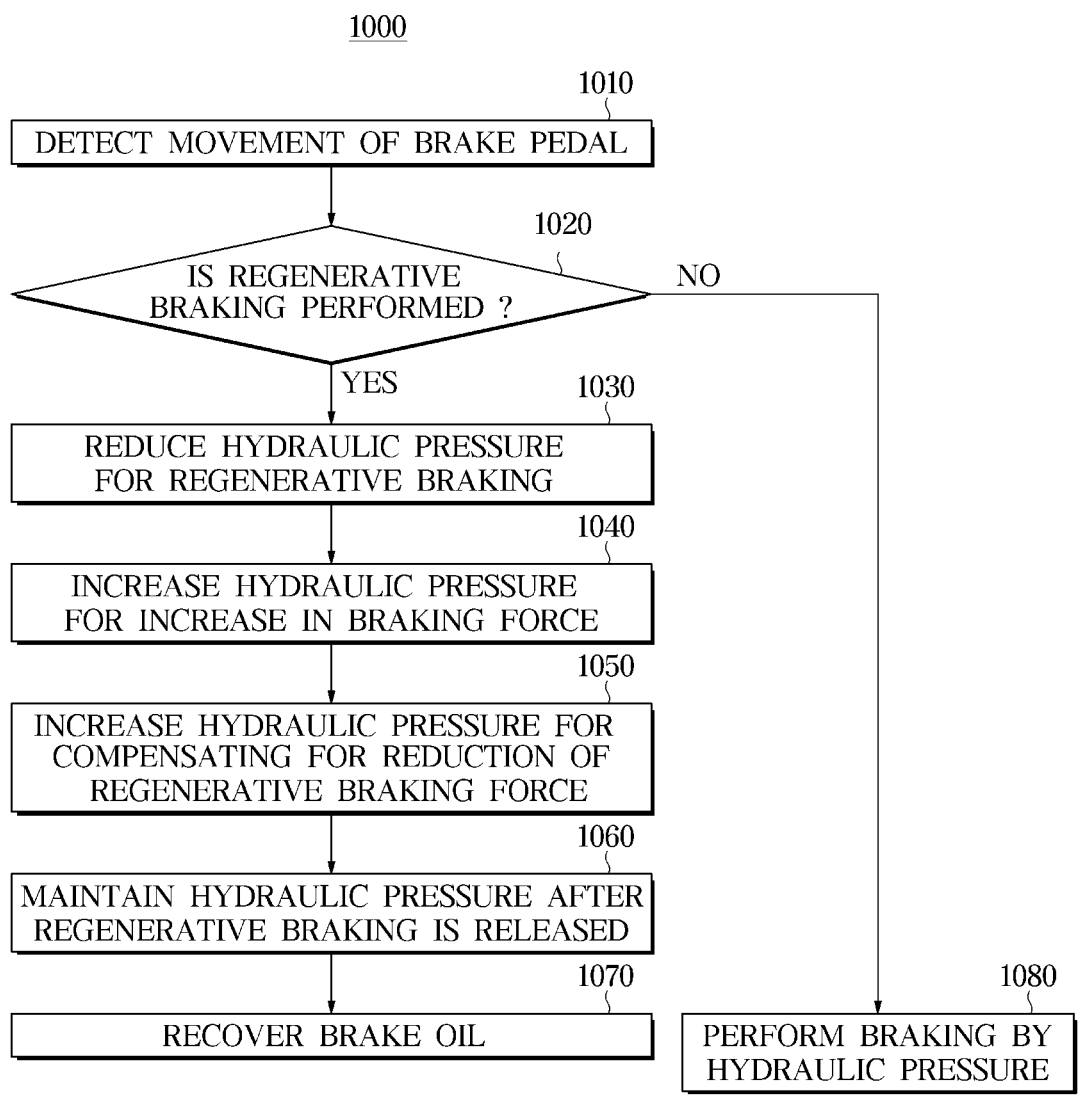
[FIG. 4]

[FIG.5]

| BRAKING MODE | | START OF REGENERATIVE BRAKING | REGENERATIVE BRAKING CONTINUES | REDUCTION OF REGENERATIVE BRAKING | RELEASE OF REGENERATIVE BRAKING | RECOVERY OF FLUID |
|---|---|---|---|---|---|---|
| | NORMAL STATE | ① | ② | ③ | ④ | ⑤ |
| VALVE | INLET | OPEN | OPEN | OPEN | OPEN | OPEN | OPEN |
| | OUTLET | CLOSE | CLOSE | CLOSE | CLOSE | CLOSE | OPEN |
| | TC | OPEN | OPEN | OPEN | CLOSE | CLOSE | OPEN |
| PUMP | | OFF | OFF | OFF | ON | OFF | OFF |
| LPA | | EMPTY | FILLING IN | FILLED | REMAINS | REMAINS | EMPTY |

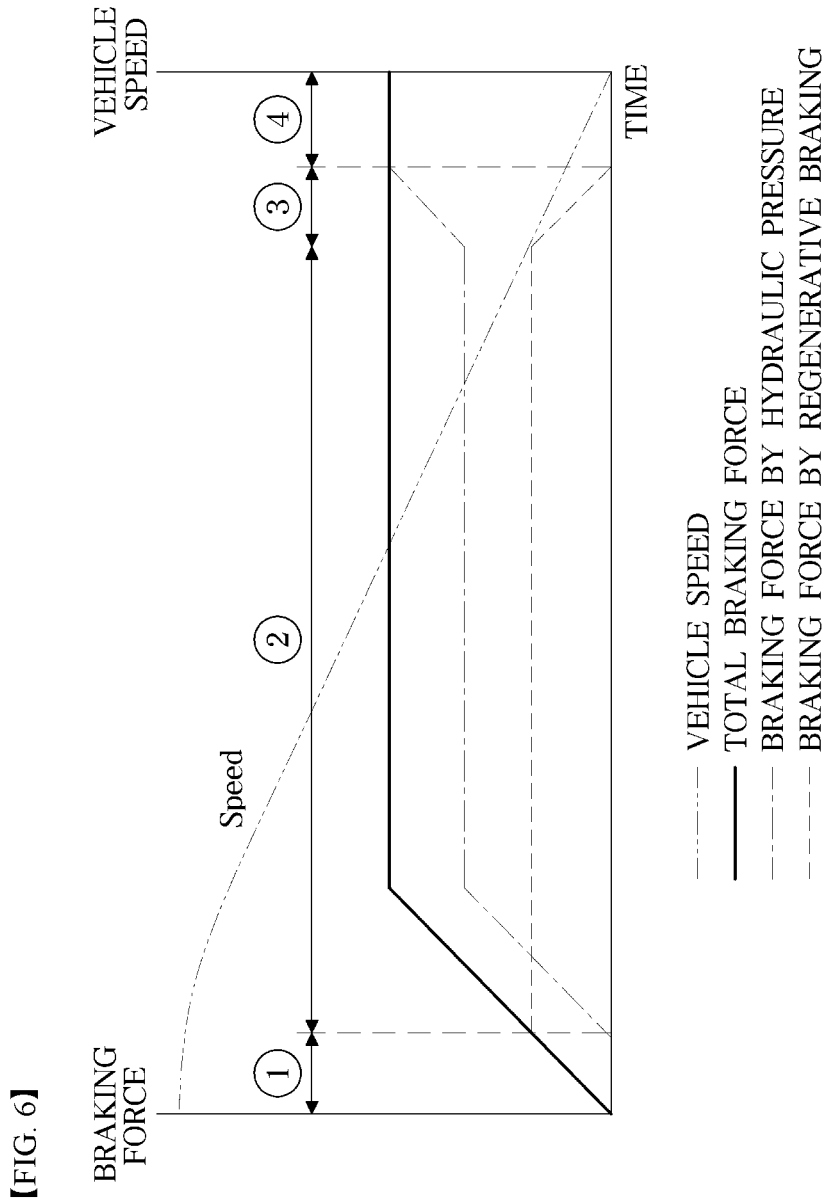
[FIG. 6]

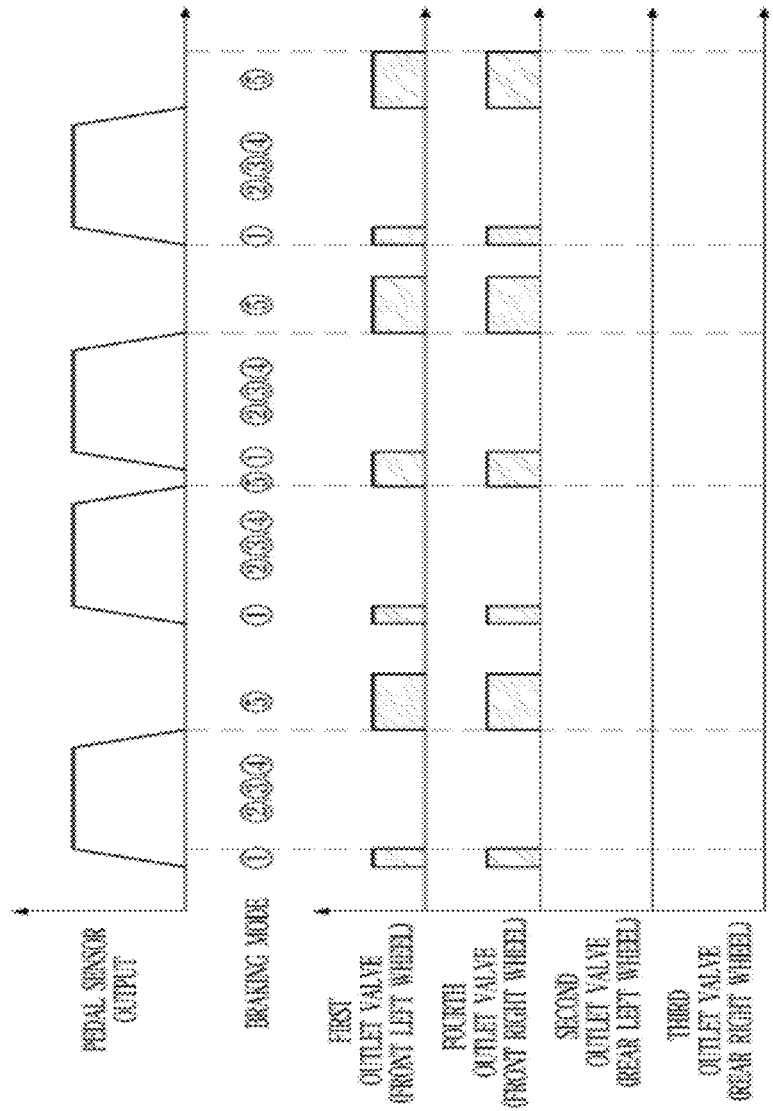
[FIG.7]

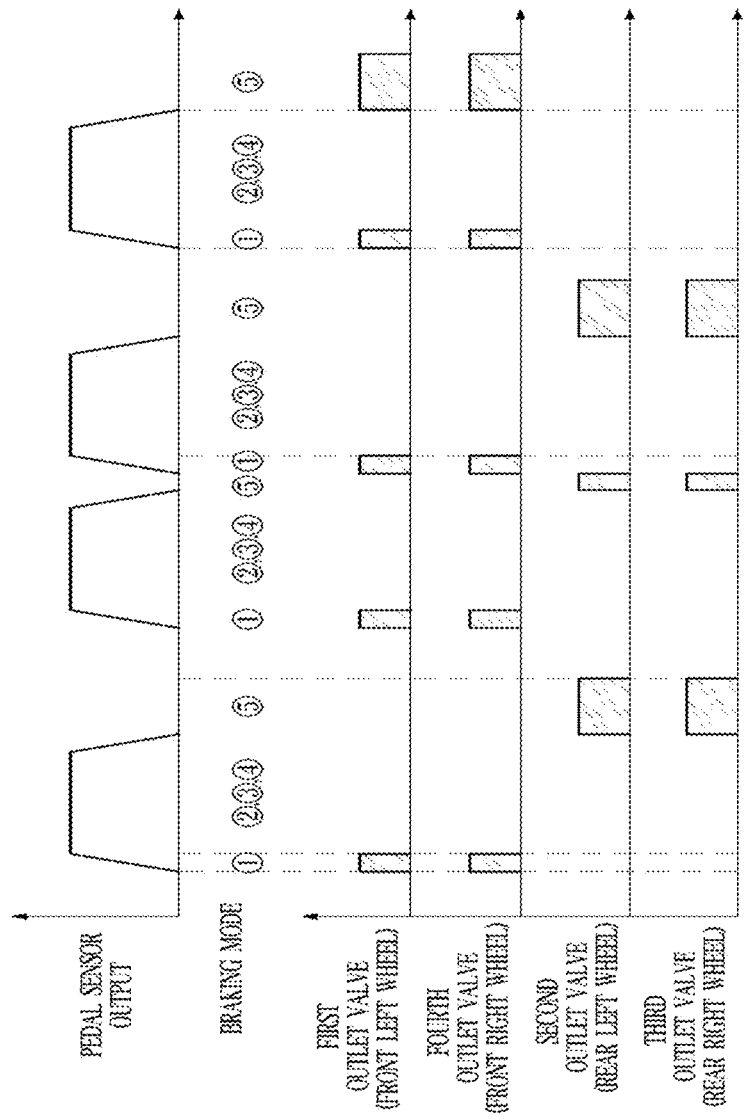

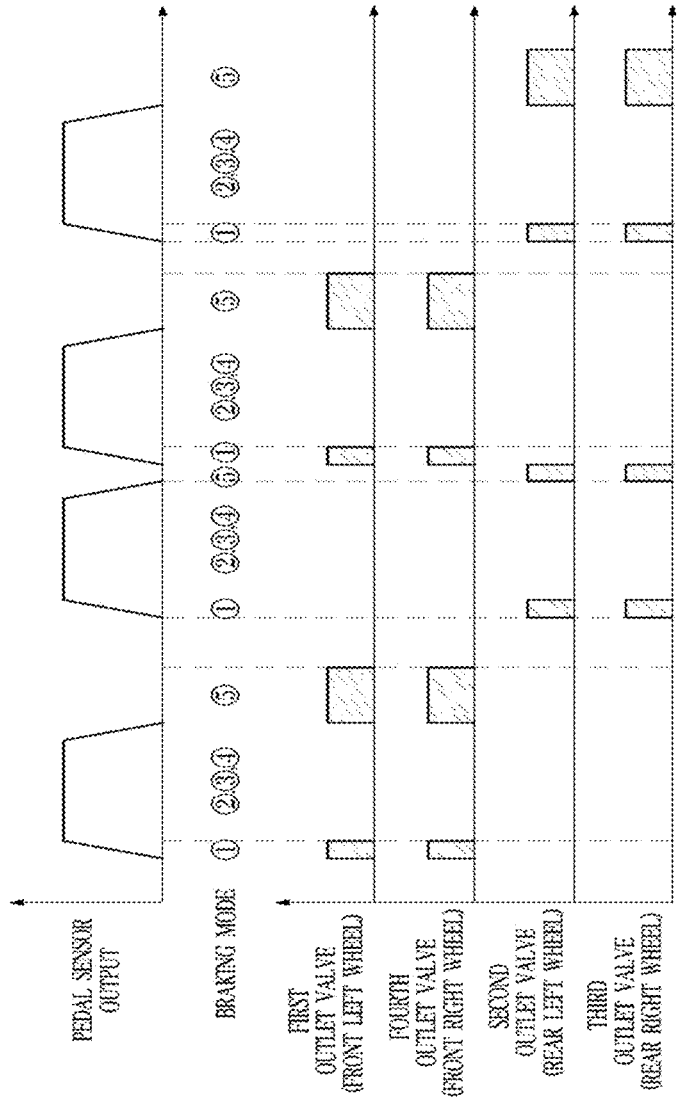
[FIG.9]

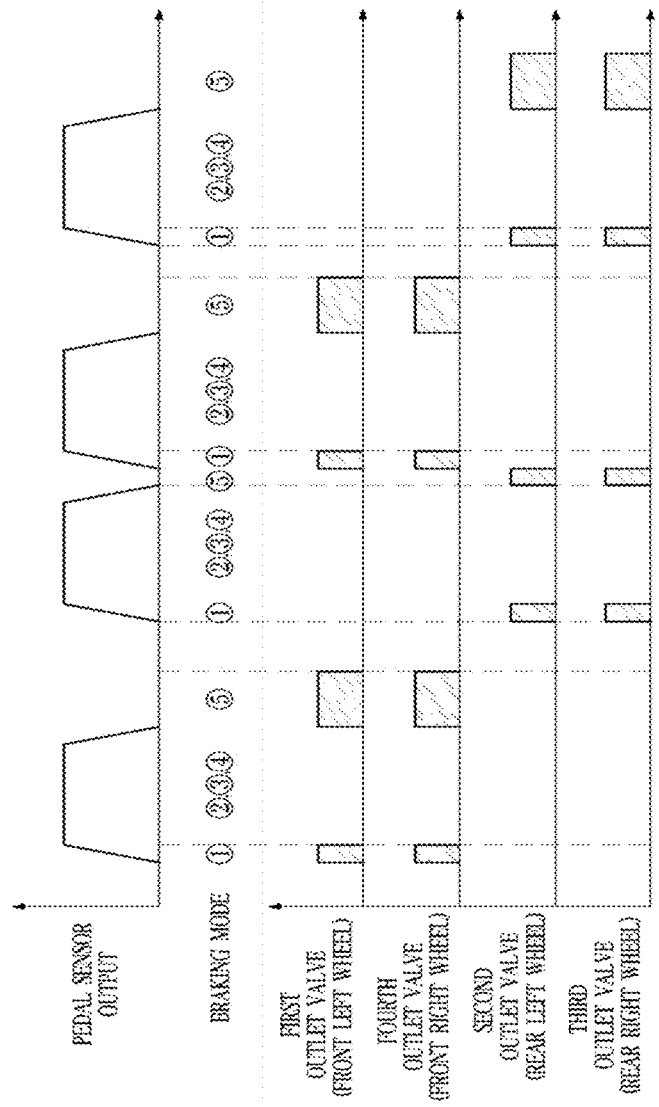
[FIG.10]

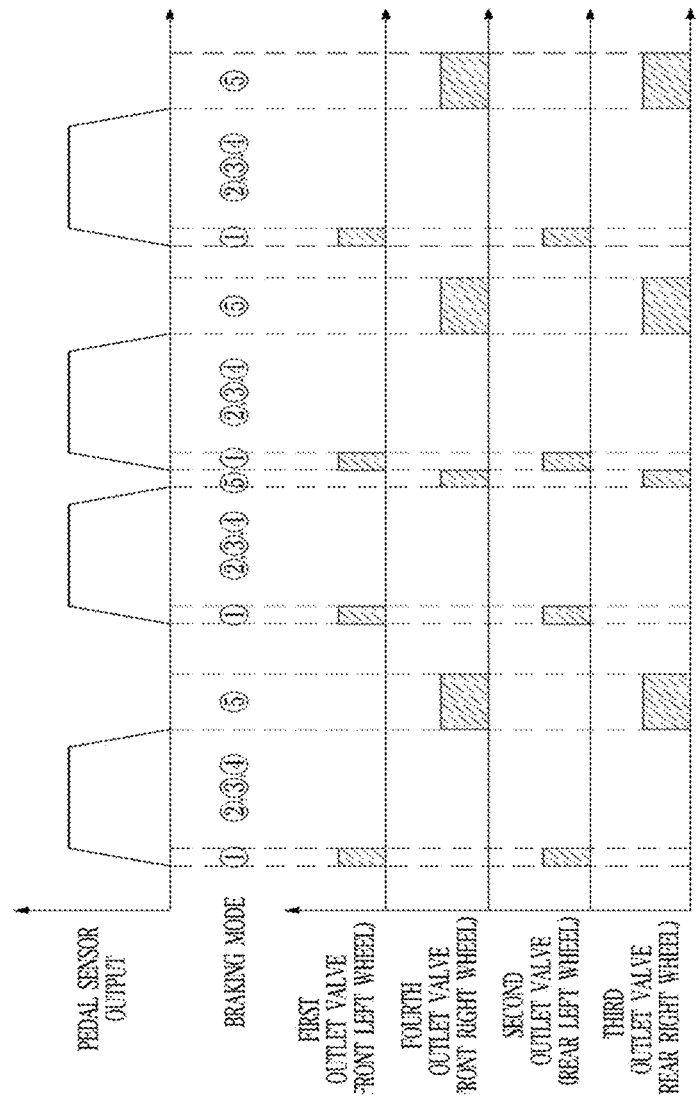

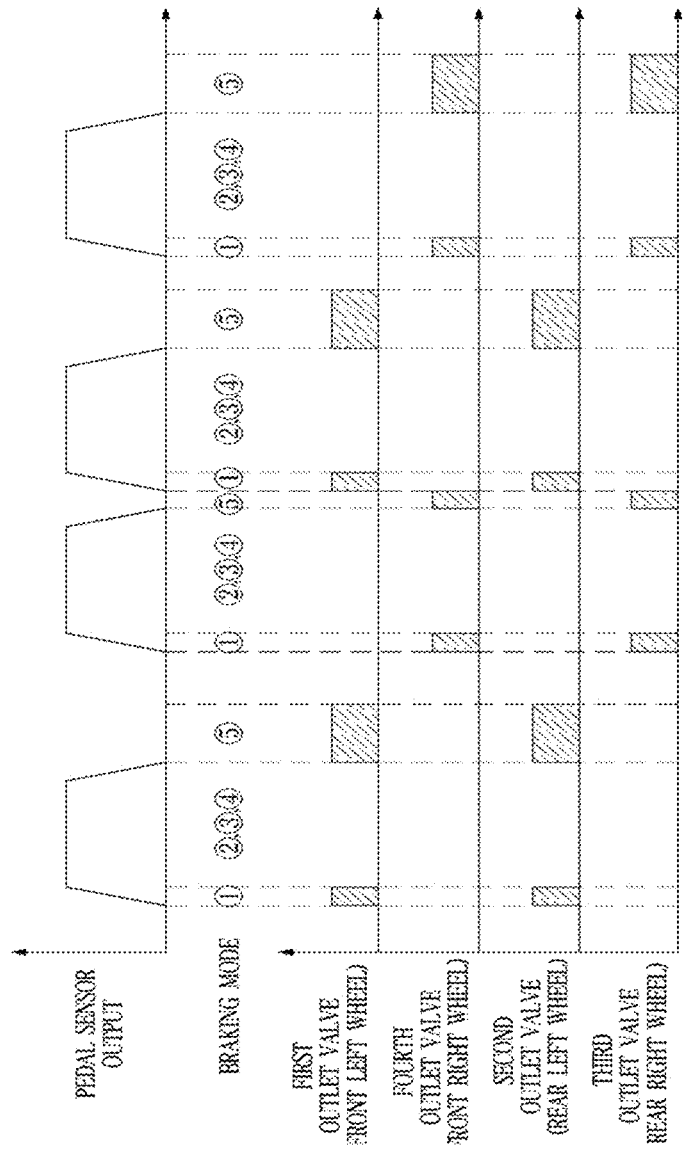
[FIG.12]

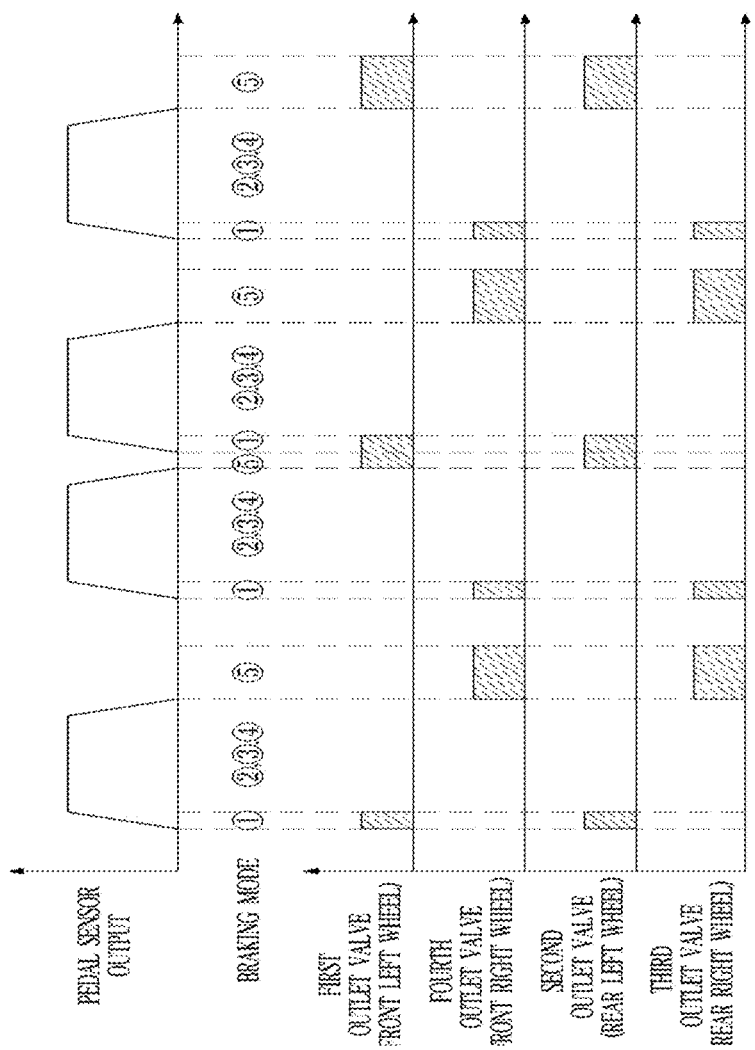

BRAKE APPARATUS AND METHOD FOR CONTROLLING SAME

CROSS-REFERENCE OF RELATED APPLICATIONS

This application is the U.S. National Phase under 35 U.S.C. § 371 of International Patent Application No. PCT/KR2020/006051, filed on May 7, 2020, which claims the benefit of Korean Patent Application No. 10-2019-0052913, filed on May 7, 2019, the entire disclosures of each are incorporated by reference herein.

TECHNICAL FIELD

The disclosure relates to a brake apparatus, and more specifically, to a brake apparatus that controls hydraulic pressure for regenerative braking, and a control method thereof.

BACKGROUND ART

A regenerative braking system is a system that generates electric energy by driving a generator when excess power to drive a vehicle due to inertia exists. Such regenerative braking system is generally operated as a single system in conjunction with a brake.

A brake plays a key role in a regenerative braking system. Although energy is regenerated while regenerative braking where a motor functions as a generator is implemented, the braking force desired by a driver may not be realized only with a regenerative brake. Accordingly, a regenerative braking cooperative control system using a hydraulic pressure supply device and an integrated braking controller that generates a braking force with a hydraulic brake has been being developed.

For instance, when a driver operates a brake pedal, the regenerative braking cooperative control system may identify how much braking force the driver requires according to a moving distance of the brake pedal (from a reference position) and a movement speed of the brake pedal, use a regenerative braking cooperative control brake as much as possible within a range of braking force, and compensate for insufficient braking force using a hydraulic brake.

However, the stress on valves increases due to frequent opening and closing of the valves during regenerative braking, which may cause a failure.

DISCLOSURE

Technical Problem

Therefore, an aspect of the disclosure provides a brake apparatus that may minimize stress on valves.

According to an aspect of the disclosure, there is provided a brake apparatus, including: a first wheel cylinder provided in a first wheel; a second wheel cylinder provided in a second wheel; a first outlet valve configured to control a discharge of brake oil from the first wheel cylinder; a second outlet valve configured to control a discharge of brake oil from the second wheel cylinder; and a controller configured to open and then close one outlet valve of the first outlet valve and the second outlet valve in response to a first braking command where a brake pedal deviates from a reference position, and to open and then close another outlet valve of the first outlet valve and the second outlet valve in response to a first braking stop command where the brake pedal is returned to the reference position.

The controller is configured to open the one outlet valve, when a braking force of regenerative braking determined based on a rotational speed of the first wheel and the second wheel is greater than a predetermined value.

The controller is configured to close the one outlet valve, when the braking force of regenerative braking reaches a maximum regenerative braking force.

The brake apparatus further including: a pump configured to pump the brake oil to the first wheel cylinder and the second wheel cylinder, wherein the controller is configured to operate the pump, when the braking force of regenerative braking decreases.

The controller is configured to open the other outlet valve, when the first braking stop command where the brake pedal is returned to the reference position is detected.

The controller is configured to open the other outlet valve, when a second braking command where the brake pedal moves from the reference position is detected.

The controller is configured to open the one outlet valve, when a second braking stop command where the brake pedal is returned to the reference position is detected.

According to an aspect of the disclosure, there is provided a control method of a brake apparatus including first and second wheel cylinders provided in first and second wheels, respectively, and first and second outlet valves configured to control a discharge of brake oil from the first and second wheel cylinders, the control method including: opening and then closing one outlet valve of the first outlet valve and the second outlet valve in response to a first braking command where a brake pedal deviates from a reference position; and opening and then closing another outlet valve of the first outlet valve and the second outlet valve in response to a first braking stop command where the brake pedal is returned to the reference position.

The opening and then closing of the one outlet valve includes opening the one outlet valve, when a braking force of regenerative braking determined based on a rotational speed of the first wheel and the second wheel is greater than a predetermined value.

The opening and then closing of the one outlet valve further includes closing the one outlet valve, when the braking force of regenerative braking reaches a maximum regenerative braking force.

The opening and then closing of the one outlet valve further includes operating a pump that pumps the brake oil to the first wheel cylinder and the second wheel cylinder, when the braking force of regenerative braking decreases.

The opening and then closing of the other outlet valve includes opening the other outlet valve, when the first braking stop command where the brake pedal is returned to the reference position is detected.

The control method further including: opening the other outlet valve, when a second braking command where the brake pedal moves from the reference position is detected.

The control method further including: opening the one outlet valve, when a second braking stop command where the brake pedal is returned to the reference position is detected.

According to an aspect of the disclosure, there is provided a brake apparatus, including: a first wheel cylinder provided in a first wheel; a second wheel cylinder provided in a second wheel; a first outlet valve configured to control a discharge of brake oil from the first wheel cylinder; a second outlet valve configured to control a discharge of brake oil from the second wheel cylinder; and a controller configured to open and then close one outlet valve of the first outlet valve and the second outlet valve in response to a first braking command where a brake pedal deviates from a reference position, and when a second braking command where the brake pedal deviates from the reference position again is detected after the first braking command, to open and then close another outlet valve of the first outlet valve and the second outlet valve.

The controller is configured to open and then close the one outlet valve in response to a first braking stop command where the brake pedal is returned to the reference position after the first braking command, and open and then close the other outlet valve in response to a second braking stop command where the brake pedal is returned to the reference position after the second braking command.

The controller is configured to open and then close the other outlet valve in response to a first braking stop command where the brake pedal is returned to the reference position after the first braking command, and open and then close the one outlet valve in response to a second braking stop command where the brake pedal is returned to the reference position after the second braking command.

Advantageous Effects

According to an aspect of the disclosure, the brake apparatus can minimize stress on valves.

DESCRIPTION OF DRAWINGS

FIG. 1 illustrates a configuration of a vehicle according to an embodiment.

FIG. 2 illustrates a hydraulic circuit of a brake apparatus according to an embodiment.

FIG. 3 illustrates a control block of a brake apparatus according to an embodiment.

FIG. 4 illustrates operations for regenerative braking of a brake apparatus according to an embodiment.

FIG. 5 illustrates opening and closing of valves by the operations for regenerative braking shown in FIG. 4.

FIG. 6 illustrates a braking force of a vehicle by the operations for regenerative braking shown in FIG. 4.

FIG. 7 illustrates an example of opening and closing of outlet valves included in operations for regenerative braking in a brake apparatus according to an embodiment.

FIG. 8 illustrates another example of opening and closing of outlet valves included in operations for regenerative braking in a brake apparatus according to an embodiment.

FIG. 9 illustrates still another example of opening and closing of outlet valves included in operations for regenerative braking in a brake apparatus according to an embodiment.

FIG. 10 illustrates yet another example of opening and closing of outlet valves included in operations for regenerative braking in a brake apparatus according to an embodiment.

FIG. 11 illustrates other example of opening and closing of outlet valves included in operations for regenerative braking in a brake apparatus according to an embodiment.

FIG. 12 illustrates other example of opening and closing of outlet valves included in operations for regenerative braking in a brake apparatus according to an embodiment.

FIG. 13 illustrates other example of opening and closing of outlet valves included in operations for regenerative braking in a brake apparatus according to an embodiment.

MODES OF THE DISCLOSURE

Like reference numerals throughout the specification denote like elements, and thus their description will be omitted. Also, this specification does not describe all the elements according to embodiments of the disclosure, and descriptions well-known in the art to which the disclosure pertains or overlapped portions are omitted. The terms such as "~part", "~block", "~member", "~module", and the like may refer to a unit for processing at least one function or act. For example, the terms may refer to at least process processed by at least one hardware or software stored in memories or processors. According to embodiments, a plurality of "~parts", "~blocks", "~members", or "~modules" may be embodied as a single element, or a single "~part", "~block", "~member", or "~module" may include a plurality of elements.

It will be understood that when an element is referred to as being "connected" to another element, it can be directly or indirectly connected to the other element, wherein the indirect connection includes "connection" via a wireless communication network.

It will be further understood that the term "include" when used in this specification, specify the presence of stated elements, but do not preclude the presence or addition of one or more other elements.

It will be further understood that when it is stated in this specification that a member is located "on" another member, not only a member may be in contact with another member, but also still another member may be present between the two members.

It will be understood that, although the terms first, second, etc. may be used herein to describe various elements, these elements should not be limited by these terms.

It is to be understood that the singular forms include plural references unless the context clearly dictates otherwise.

Reference numerals used for method steps are just used for convenience of explanation, but not to limit an order of the steps. Thus, unless the context clearly dictates otherwise, the written order may be practiced otherwise.

Hereinafter, an operation principle and embodiments will be described in detail with reference to accompanying drawings.

FIG. 1 illustrates a configuration of a vehicle according to an embodiment.

As shown in FIG. 1, the vehicle 1 may include a power generation device 2, a power transmission device 3, a steering device 4, a plurality of wheels 5, a brake apparatus 10, and the like, to enable the vehicle 1 to drive in response to a control of a driver and/or a self-driving system. Also, the vehicle 1 may further include a frame 6 to fix the power generation device 2, the power transmission device 3, the steering device 4, the plurality of wheels 5, and the brake apparatus 10.

The power generation device 2 may generate power (rotation) for driving the vehicle 1. For example, the power generation device 2 may include an engine 2a, a fuel tank FT, an exhaust device, a generator 2b, a battery B, and the like. The engine 2a may produce power (rotation) by combustion of fossil fuels. The generator 2b may produce electric power from the power (rotation) of the engine 2a. The generator 2b may not only convert rotation into electric power, but also convert electric power to rotation. That is, the generator 2b may produce electric power as a generator, and also generate power (rotation) as an electric motor.

The power transmission device 3 may transmit the power generated by the power generation device 2 to the wheels 5. For example, the power transmission device 3 may include a clutch/transmission 3a, a drive shaft 3b, a differential, and the like.

The steering device 4 may control a driving direction of the vehicle 1. For example, the steering device 4 may include a steering wheel 4a, a steering gear 4b, a steering link 4c, and the like.

The wheels 5 are provided with the power (rotation) generated by the power generation device 2 through the power transmission device 3, and may move the vehicle 1. The wheels 5 include a front left wheel 5FL provided on a front left side of the vehicle 1, a rear right wheel 5RR provided on a rear right side of the vehicle 1, a rear left wheel 5RL provided on a rear left side of the vehicle 1, and a front right wheel 5FR provided on a front right side of the vehicle 1.

The brake apparatus 10 may stop rotation of the wheels 5 and stop the vehicle 1.

The brake apparatus 10 includes a front left brake apparatus 10FL for stopping rotation of the front left wheel 5FL, a rear right brake apparatus 10RR for stopping rotation of the rear right wheel 5RR, a rear left brake apparatus 10RL for stopping rotation of the rear left wheel 5RL, and a front right brake apparatus 10FR for stopping rotation of the front right wheel 5FR.

For instance, each of the brake apparatuses 10FL, 10RR, 10RL and 10FR may include a brake disc 10a coupled to the plurality of wheels 5FL, 5RR, 5RL and 5FR and a brake pad 10b fixed to the frame 6, and the like. The brake apparatuses 10FL, 10RR, 10RL and 10FR may bring the brake pad 10b into contact with the brake disc 10a by hydraulic pressure, and stop the wheels 5FL, 5RR, 5RL and 5FR by friction between the brake pad 10b and the brake disc 10a.

The brake apparatus 10 will be described in greater detail below.

FIG. 2 illustrates a hydraulic circuit of a brake apparatus according to an embodiment.

As shown in FIG. 2, the brake apparatus 10 includes a brake pedal 11, a brake booster 12, a master cylinder 20, a first wheel cylinder 31, a second wheel cylinder 32, a third wheel cylinder 33, a fourth wheel cylinder 34, and hydraulic circuits 40 and 50. The brake pedal 11 receives a driver's braking intention, and the brake booster 12 doubles a pedal effort of the brake pedal 11 using a pressure difference between vacuum and atmospheric pressure. The master cylinder 20 generates pressure by the brake booster 12. The first wheel cylinder 31, the second wheel cylinder 32, the third wheel cylinder 33, and the fourth wheel cylinder 34 are provided on the front right wheel 5FR, the rear left wheel 5RL, the front left wheel 5FL, and the rear right wheel 5RR, respectively. The hydraulic circuits 40 and 50 connect the master cylinder 20 to the wheel cylinders 31, 32, 33 and 34.

The hydraulic circuits 40 and 50 includes a first hydraulic circuit 40 and a second hydraulic circuit 50.

The first hydraulic circuit 40 may connect a first port 21 of the master cylinder 20 to the first and second wheel cylinders 31 and 32. The first hydraulic circuit 40 may transmit or block pressure of brake oil generated by the master cylinder 20 to or from the first and second wheel cylinders 31 and 32.

The first hydraulic circuit 40 includes a passage that connects the master cylinder 20 to the first and second wheel cylinders 31 and 32. Also, the first hydraulic circuit 40 includes first and second inlet valves 41 and 42, first and second outlet valves 43 and 44, a first low pressure accumulator 45, and a first pump 46.

Each of the first and second inlet valves 41 and 42 is disposed on the passage that connects the master cylinder 20 to the first and second wheel cylinders 31 and 32. Each of the first and second inlet valves 41 and 42 may control the pressure of the brake oil transmitted to the first and second wheel cylinders 31 and 32 from the master cylinder 20. Each of the first and second inlet valves 41 and 42 may be a normal open solenoid valve.

Each of the first and second outlet valves 43 and 44 is disposed on a passage that connects the first and second wheel cylinders 31 and 32 to the first low pressure accumulator 45. Each of the first and second outlet valves 43 and 44 may control pressure of the brake oil discharged from the first and second wheel cylinders 31 and 32. Each of the first and second outlet valves 43 and 44 may be a normal closed solenoid valve.

The first low pressure accumulator 45 may temporarily store the brake oil discharged from the first and second wheel cylinders 31 and 32.

The first pump 46 may pump the brake oil stored in the first low pressure accumulator 45 to the first and second wheel cylinders 31 and 32 through the first and second inlet valves 41 and 42.

The first hydraulic circuit 40 further includes a first main passage 47a that connects an outlet of the first pump 46 to the master cylinder 20, and a first traction control valve 48 (hereinafter, referred to as a 'first TC valve') provided on the first main passage 47a.

The first TC valve 48 is provided for a traction control function of the vehicle 1, and may be a normal open solenoid valve. The first TC valve 48 in an open state may allow the pressure of the brake oil from the master cylinder 20 to be transmitted to the first and second wheel cylinders 31 and 32. When the first pump 46 is operated, the first TC valve 48 may be closed, and the first TC valve 48 in a closed state may disconnect the first hydraulic circuit 40 from the master cylinder 20 and block the pressure of the brake oil by the first pump 46 from being transmitted to the master cylinder 20.

Also, the first hydraulic circuit 40 further includes a first auxiliary passage 47b that connects an inlet of the first pump 46 to the master cylinder 20 and a first electronic switching valve 49 (hereinafter, referred to as a 'first ESV valve') provided on the first auxiliary passage 47b.

The first ESV valve 49 is provided to recover the brake oil of the first hydraulic circuit 40 to the master cylinder 20, and may be a normal closed solenoid valve. The first ESV valve 49 in a closed state may disconnect the first hydraulic circuit 40 from the master cylinder 20. The first ESV valve 49 in an open state may allow the brake oil to flow to the master cylinder 20 from the first and second wheel cylinders 31 and 32 and the first low pressure accumulator 45.

Also, the first hydraulic circuit 40 further includes check valves provided at an appropriate location on passage to prevent a reverse flow of the brake oil.

The second hydraulic circuit 50 may connect a second port 22 of the master cylinder 20 to the third and fourth wheel cylinders 33 and 34, and transmit the pressure of the brake oil generated by the master cylinder 20 to the third and fourth wheel cylinders 33 and 34.

The second hydraulic circuit 50 includes third and fourth inlet valves 51 and 52, third and fourth outlet valves 53 and 54, a second low pressure accumulator 55, a second pump 56, a second TC valve 58, and a second ESV valve 59. Here, the third and fourth inlet valves 51 and 52, the third and fourth outlet valves 53 and 54, the second low pressure accumulator 55, the second pump 56, the second TC valve 58, and the second ESV valve 59 may function identically to the first and second inlet valves 41 and 42, the first and second outlet valves 43 and 44, the first low pressure accumulator 45, the first pump 46, the first TC valve 48 and the first ESV valve 49, respectively.

The brake apparatus 10 further includes a pump motor 60, a first pressure sensor 71, a second pressure sensor 72, and a third pressure sensor 73. The pump motor 60 drives the first and second pumps 46 and 56. The first pressure sensor 71 measures a pressure of the first and second wheel cylinders 31 and 32, the second pressure sensor 72 measures a pressure of the third and fourth wheel cylinders 33 and 34, and the third pressure sensor 73 measures a discharge pressure of the master cylinder 20.

FIG. 3 illustrates a control block of a brake apparatus according to an embodiment.

The brake apparatus 10 includes a pedal sensor 11a, pressure sensors (70: 71, 72, 73), wheel speed sensors (110: 111, 112, 113, 114), a driving part 120, the inlet valves 41, 42, 51 and 52, the outlet valves 43, 44, 53 and 54, the TC valves 48 and 58, the ESV valves 49 and 59, and a controller 130.

The pedal sensor 11a may be physically connected to the brake pedal 11, and detect a position and/or a movement of the brake pedal 11. For example, a moving distance and a movement speed of the brake pedal 11 may be measured by the pedal sensor 11a.

The pedal sensor 11a may be electrically connected to the controller 130. For instance, the pedal sensor 11a may be connected to the controller 130 via a hard wire or a communication network.

The pedal sensor 11a may transmit a detection signal (voltage or current) indicating the position (or movement) of the brake pedal 11 to the controller 130.

The pressure sensor 70 includes the first pressure sensor 71, the second pressure sensor 72 and the third pressure sensor 73. The first to third pressure sensors 70 may be installed on the hydraulic circuits 40 and 50. The first pressure sensor 71 may measure a pressure of the first and second wheel cylinders 31 and 32, the second pressure sensor 72 may measure a pressure of the third and fourth wheel cylinders 33 and 34, and the third pressure sensor 73 may measure a discharge pressure of the master cylinder 20.

The pressure sensor 70 may be electrically connected to the controller 130. For instance, the pressure sensor 70 may be connected to the controller 130 via a hard wire or a communication network.

The pressure sensor 70 may transmit a detection signal (voltage or current) indicating the measured pressure to the controller 130.

The wheel speed sensor 110 may be installed on the wheel 5, and measure a rotational speed of the wheel 5. For instance, the wheel speed sensor 110 may include a first wheel speed sensor 111 that measures a rotational speed of the front right wheel 5FR, a second wheel speed sensor 112 that measures a rotational speed of the rear left wheel 5RL, a third wheel speed sensor 113 that measures a rotational speed of the front left wheel 5FL and a fourth wheel speed sensor 114 that measures a rotational speed of the rear right wheel 5RR.

The wheel speed sensor 110 may be electrically connected to the controller 130. For instance, each of the wheel speed sensors 111, 112, 113, and 114 may be connected to the controller 130 via a hard wire or a communication network.

The wheel speed sensor 110 may transmit a detection signal (voltage or current) indicating the measured rotational speed to the controller 130.

The inlet valves 41, 42, 51 and 52, the outlet valves 43, 44, 53 and 54, the TC valves 48 and 58, and the ESV valves 49 and 59 may be the same as the inlet valves, the outlet valves, the TC valves and the ESV valves, respectively, as described above with reference to FIG. 2.

The inlet valves 41, 42, 51 and 52, the outlet valves 43, 44, 53 and 54, the TC valves 48 and 58, and the ESV valves 49 and 59 may be electrically connected to the driving part 120, and be supplied with driving voltage and/or driving current from the driving part 120.

The pump motor 60 may provide rotation to the first and second pumps 46 and 56. The pump motor 60 may be electrically connected to the driving part 120, and be supplied with driving voltage and/or driving current from the driving part 120.

The driving part 120 may include a drive circuit 121 that supplies a driving voltage and/or driving current to the inlet valves 41, 42, 51 and 52, the outlet valves 43, 44, 53 and 54, the TC valves 48 and 58, the ESV valves 49 and 59, and the pump motor 60.

For instance, the drive circuit 121 may include a transistor that allows or blocks a driving current supplied to the inlet valves 41, 42, 51 and 52, the outlet valves 43, 44, 53 and 54, the TC valves 48 and 58, the ESV valves 49 and 59, and the pump motor 60. For example, the drive circuit 121 may include a full bridge inverter, a half bridge inverter, and the like.

The driving part 120 may be electrically connected to the controller 130. For instance, the driving part 120 may be connected to the controller 130 via a hard wire or a communication network.

The driving part 120 may allow or block the driving current supplied to the inlet valves 41, 42, 51 and 52, the outlet valves 43, 44, 53 and 54, the TC valves 48 and 58, and the ESV valves 49 and 59, in response to a driving signal received from the controller 130.

The controller 130 may be variously referred to as an electronic control unit (ECU), a micro controller unit (MCU), and the like.

The controller 130 may be electrically connected to the pedal sensor 11a, the pressure sensors 70 and the wheel speed sensors 110, and receive a detection signal from the pedal sensor 11a, the pressure sensors 70 and the wheel speed sensors 110. Also, the controller 130 may be electrically connected to the driving part 120 and transmit a driving signal to the driving part 120.

The controller 130 includes a processor 131 that processes a monitoring signal and provides the driving signal, and a memory 132 that stores and/or records a program and data related to an operation of the processor 131.

The processor 131 may process the monitoring signal and provide the driving signal according to the program and data stored and/or recorded in the memory 132.

For instance, the processor 131 may identify a driver's braking intention based on the detection signal of the pedal sensor 11a. The processor 131 may identify a braking force of the vehicle 1 based on the detection signal of the pressure sensor 70. The processor 131 may identify slip of the wheels 5 based on the detection signal of the wheel speed sensors 110.

The processor 131 may identify the driver's braking intention based on the detection signal of the pedal sensor 11a, and provide the driving part 120 with a driving signal for opening the inlet valves 41, 42, 51 and 52 and closing the outlet valves 43, 44, 53 and 54, so that the brake oil may be transmitted to the wheel cylinders 31, 32, 33 and 34, in response to the driver's braking intention.

The processor 131 may identify an end of braking based on the detection signal of the pedal sensor 11a, and provide the driving part 120 with a driving signal for closing the inlet valves 41, 42, 51 and 52 and opening the outlet valves 43, 44, 53 and 54, so that the brake oil of the wheel cylinders 31, 32, 33 and 34 may be transmitted to the low pressure accumulators 45 and 55, in response to the end of braking.

The processor 131 may identify the slip of the wheels 5 based on the detection signal of the wheel speed sensors 110, and provide the driving part 120 with a driving signal for closing the inlet valves 41, 42, 51 and 52 and opening the outlet valves 43, 44, 53 and 54, so that the brake oil of the wheel cylinders 31, 32, 33 and 34 may be transmitted to the low pressure accumulators 45 and 55, in response to the wheel slip. Afterwards, the processor 131 may provide the driving part 120 with a driving signal for opening the inlet valves 41, 42, 51 and 52, closing the outlet valves 43, 44, 53 and 54, and driving the pump motor 60, so that the brake oil may be transmitted to the wheel cylinders 31, 32, 33 and 34.

The memory 132 may store a program and data for the processor 131 to process the detection signal and output the driving signal.

The memory 132 may store the detection signals of the pedal sensor 11a, the pressure sensors 70 and the wheel speed sensors 110, and store temporary data generated during processing of the detection signal by the processor 131. Also, the memory 132 may store the driving signal provided from the processor 131 to the valves and the pumps.

The memory 132 may include a volatile memory such as a static random access memory (S-RAM), a dynamic random access memory (D-RAM), and the like, and a non-volatile memory such as a read only memory (ROM), an erasable programmable read only memory (EPROM), and the like.

The memory 132 and the processor 132 may be provided integrally or the memory 132 may be provided separately from the processor 131.

The controller 130 may further include a control circuitry for controlling an operation of the brake apparatus 10, with the processor 131 and the memory 132.

As described above, the controller 130 may control the brake apparatus 10 to detect the driver's braking intention and stop the vehicle 1 in response to the driver's braking intention.

Also, the controller 130 may control the valves and the pumps for regenerative braking, together with the power generation device 2. Regenerative braking refers to stopping rotation of the wheels 5 by generating electric power from the rotation of the wheels 5. The power generation device 2 may generate electric power through the generator 2b in response to the driver's braking intention, and a braking force is generated at the wheels 5, while the power generation device 2 generates the electric power.

To prevent the driver from feeling unfamiliar braking by regenerative braking, the controller 130 may reduce a braking force due to friction during regenerative braking. For instance, during regenerative braking, the controller 130 may control the driving part 120 to open the outlet valves 43, 44, 53 and 54, and thus a pressure of the brake oil may be transmitted to the low pressure accumulators 45 and 55, not to the wheel cylinders 31, 32, 33 and 34, due to the opening of the outlet valves 43, 44, 53 and 54. Accordingly, the braking force by the brake apparatus 10 may be reduced.

An operation of the brake apparatus 10 during regenerative braking is described in greater detail below.

FIG. 4 illustrates operations for regenerative braking of a brake apparatus according to an embodiment. FIG. 5 illustrates opening and closing of valves by the operations for regenerative braking shown in FIG. 4. FIG. 6 illustrates a braking force of a vehicle by the operations for regenerative braking shown in FIG. 4.

Operations 1000 of the brake apparatus 10 for performing regenerative braking are described in detail with reference to FIGS. 4, 5 and 6.

The brake apparatus 10 detects a movement of the brake pedal 11 (1010).

A driver may press the brake pedal 11 to stop the vehicle 1 in motion or reduce a speed of the vehicle 1. That is, the driver may move the brake pedal 11 from a reference position to input a braking command to the vehicle 1.

The pedal sensor 11a may detect a position and/or movement of the brake pedal 11. That is, the pedal sensor 11a may receive the driver's braking command. Also, the pedal sensor 11a may transmit a detection signal (voltage or current) indicating the position (or movement) of the brake pedal 11 to the controller 130.

The controller 130 of the brake apparatus 10 may identify the movement of the brake pedal 11 based on the detection signal output form the pedal sensor 11a.

The brake apparatus 10 identifies whether to perform regenerative braking (1020).

The vehicle 1 may identify whether to perform regenerative braking based on a moving distance of the brake pedal 11 and the speed of the vehicle 1.

When the moving distance of the brake pedal 11 is greater than or equal to a predetermined distance, the vehicle 1 may identify a driver's braking intention, and the power generation device 2 and the brake apparatus 10 may perform regenerative braking in response to the driver's braking intention.

A maximum braking force that may be generated by regenerative braking may depend on a rotational speed of the wheels 5 or a running speed of the vehicle 1. For example, the maximum braking force of regenerative braking in a high speed section of the vehicle 1 may increase, as the speed of the vehicle 1 decreases. Also, the maximum braking force of regenerative braking in a low speed section of the vehicle 1 may decrease, as the speed of the vehicle 1 decreases.

When the maximum braking force of regenerative braking by the speed of the vehicle 1 is greater than a predetermined value, (e.g. greater than 0), the power generation device 2 and the brake apparatus 10 may perform regenerative braking.

As described above, when the moving distance of the brake pedal 11 is greater than or equal to the predetermined distance and the braking force of regenerative braking by the speed of the vehicle 1 is greater than the predetermined value, the power generation device 2 and the brake apparatus 10 may perform regenerative braking.

When it is identified that regenerative braking is not performed (No in operation 1020), the brake apparatus 10 performs braking by hydraulic pressure (or friction) (1080).

In response to the driver's braking intention, the controller 130 may open the inlet valves 41, 42, 51 and 52 and close the outlet valves 43, 44, 53 and 54, so that brake oil may be transmitted to the wheel cylinders 31, 32, 33 and 34.

Afterwards, the controller 130 close the inlet valves 41, 42, 51 and 52 and open the outlet valves 43, 44, 53 and 54 in response to an end of the driver's braking intention.

When it is identified that regenerative braking is to be performed (Yes in operation 1020), the brake apparatus 10 reduces a hydraulic pressure of the wheel cylinders 31, 32, 33 and 34 for regenerative braking (1030).

When it is identified that regenerative braking is to be performed, the power generation device 2 may generate electric power by using regenerative braking, and a braking force on the wheels 5 is generated during regenerative braking.

To prevent the driver from feeling unfamiliar braking by regenerative braking, the controller 130 may reduce the pressure of the wheel cylinders 31, 32, 33 and 34 during regenerative braking. During regenerative braking, the controller 130 may control the driving part 120 to open the outlet valves 43, 44, 53 and 54, and thus the pressure of the brake oil may not be transmitted to the wheel cylinders 31, 32, 33 and 34.

For instance, as shown in FIG. 5, in a braking mode ①, the power generation device 2 may perform regenerative braking. Also, in the braking mode ①, the controller 130 of the brake apparatus 10 may open the inlet valves 41, 42, 51 and 52, open the outlet valves 43, 44, 53 and 54, open the TC valves 48 and 58, and turn off the pump motor 60, so that braking by the hydraulic pressure (or friction) is not provided. Accordingly, as shown in FIG. 6, in the braking mode ①, the braking force by regenerative braking increases, and braking by the hydraulic pressure (or friction) may not be provided.

Afterwards, the brake apparatus 10 increases the hydraulic pressure of the wheel cylinders 31, 32, 33 and 34 to increase the braking force (1040).

The braking force by regenerative braking may be limited to a maximum braking force by the power generation device 2. In this instance, the driver may press the brake pedal 11 harder for a braking force greater than the maximum braking force by regenerative braking.

The brake apparatus 10 may increase the hydraulic pressure of the wheel cylinders 31, 32, 33 and 34 to generate the braking force greater than the maximum braking force by regenerative braking.

For example, as shown in FIG. 5, in a braking mode ②, the power generation device 2 may maintain regenerative braking, and at the same time, the controller 130 of the brake apparatus 10 may open the inlet valves 41, 42, 51 and 52, close the outlet valves 43, 44, 53 and 54, open the TC valves 48 and 58, and turn off the pump motor 60, so that braking by the hydraulic pressure (or friction) is provided. Accordingly, as shown in FIG. 6, in the braking mode ②, the braking force by regenerative braking may be maintained at the maximum braking force, and a braking force by the hydraulic pressure (or friction) may be generated.

Afterwards, the brake apparatus 10 increases the hydraulic pressure of the wheel cylinders 31, 32, 33 and 34 to compensate for the decrease in the braking force by regenerative braking (1050).

In the low speed section of the vehicle 1, the braking force by regenerative braking may decrease, as the speed of the vehicle 1 decreases.

The brake apparatus 10 may increase the pressure of the wheel cylinders 31, 32, 33 and 34 to compensate for the decrease in the braking force by regenerative braking.

For instance, as shown in FIG. 5, in a braking mode ③, the braking force by regenerative braking may decrease. The controller 130 of the brake apparatus 10 may open the inlet valves 41, 42, 51 and 52, close the outlet valves 43, 44, 53 and 54, close the TC valves 48 and 58, and turn on the pump motor 60, in order to increase the braking force by the hydraulic pressure (or friction). Accordingly, as shown in FIG. 6, the braking force by regenerative braking decreases, but a total braking force may be maintained.

Afterwards, when regenerative braking is deactivated, the brake apparatus 10 maintains the hydraulic pressure of the wheel cylinders 31, 32, 33 and 34 to keep the braking force constant (1060).

As the speed of the vehicle 1 decreases, the braking force by regenerative braking decreases, and regenerative braking may be deactivated.

When regenerative braking is deactivated, the brake apparatus 10 may maintain the pressure of the wheel cylinders 31, 32, 33 and 34, so that the total braking force may be maintained.

For example, as shown in FIG. 5, in a braking mode ④, regenerative braking may be deactivated. The controller 130 of the brake apparatus 10 may open the inlet valves 41, 42, 51 and 52, close the outlet valves 43, 44, 53 and 54, close the TC valves 48 and 58, and turn off the pump motor 60, in order to keep the braking force by the hydraulic pressure (or friction) constant. Accordingly, as shown in FIG. 6, even when regenerative braking is deactivated, the total braking force may be maintained.

Afterwards, when the driver's braking command is finished, the brake apparatus 10 recovers the brake oil remaining in the hydraulic circuits 40 and 50 to the master cylinder 20 (1070).

When the vehicle 1 stops or the driver attempts to accelerate the vehicle 1, the driver may stop pressing the brake pedal 11. The brake pedal 11 may return to a reference position by an elastic body. The pedal sensor 11a may detect that the brake pedal 11 has returned to the reference position, i.e. a braking stop command. Also, the controller 130 may detect that the brake pedal 11 is in the reference position through the pedal sensor 11a.

When the brake pedal 11 in the reference position is detected, the controller 130 may recover the brake oil remaining in the hydraulic circuits 40 and 50 to the master cylinder 20. In particular, the controller 130 may recover the brake oil remaining in the low pressure accumulators 45 and 55 to the master cylinder 20.

For example, as shown in FIG. 5, in a braking mode ⑤, the controller 130 of the brake apparatus 10 may open the inlet valves 41, 42, 51 and 52, and the outlet valves 43, 44, 53 and 54, open the TC valves 48 and 58 and the ESV valves, and turn off the pump motor 60, in order to recover the brake oil of the wheel cylinders 31, 32, 33 and 34.

As described above, the brake apparatus 10 may reduce the braking force by friction (or hydraulic pressure) during regenerative braking.

The brake apparatus 10 may open the outlet valves 43, 44, 53 and 54 to reduce the braking force, and after the braking is finished, the brake apparatus 10 may open the outlet valves 43, 44, 53 and 54 to recover the brake oil of the wheel cylinders 31, 32, 33 and 34.

Hereinafter, operations of the outlet valves 43, 44, 53 and 54 are described.

FIG. 7 illustrates an example of opening and closing of outlet valves included in operations for regenerative braking in a brake apparatus according to an embodiment.

As described above, the brake apparatus 10 may close the outlet valves 43, 44, 53 and 54 after opening the outlet valves 43, 44, 53 and 54 at least twice for regenerative braking.

The controller 130 may open and then close the outlet valves 43, 44, 53 and 54 in the braking mode ① where regenerative braking is initiated, and open and then close the outlet valves 43, 44, 53 and 54 in the braking mode ⑤ to recover the brake oil of the wheel cylinders 31, 32, 33 and 34.

The controller 130 may open only one of the outlet valves 43, 44, 53 and 54 included in each of the first and second hydraulic circuits 40 and 50, in order to minimize stress due to the opening of the outlet valves 43, 44, 53 and 54 which are a normal closed solenoid valve.

For instance, as shown in FIG. 7, in the braking mode ①, the controller 130 may open the first outlet valve 43 of the first hydraulic circuit 40 and the fourth outlet valve 54 of the second hydraulic circuit 50. The first outlet valve 43 may control a pressure of the first wheel cylinder 31 provided on a front right wheel 5FR, and the fourth outlet valve 54 may control a pressure of the fourth wheel cylinder 34 provided on a rear right wheel 5RR.

Due to the opening of the first outlet valve 43 of the first hydraulic circuit 40, both the pressure of the first wheel cylinder 31 and a pressure of the second wheel cylinder 32 may be reduced. Also, due to the opening of the fourth outlet valve 54 of the second hydraulic circuit 50, both the pressure of the fourth wheel cylinder 34 and a pressure of the third wheel cylinder 33 may be reduced.

In the braking mode ⑤, the controller 130 may open the first outlet valve 43 of the first hydraulic circuit 40 and the fourth outlet valve 54 of the second hydraulic circuit 50.

Due to the opening of the first outlet valve 43 of the first hydraulic circuit 40, the brake oil of both the first wheel cylinder 31 and the second wheel cylinder 32 may be recovered. Due to the opening of the fourth outlet valve 54 of the second hydraulic circuit 50, the brake oil of both the third wheel cylinder 33 and the fourth wheel cylinder 34 may be recovered.

However, because the first outlet valve 43 and the fourth outlet valve 54 are closed after opening in the braking modes ① and ⑤, the stress due to the opening and closing of the valves may be concentrated on the first outlet valve 43 and the fourth outlet valve 54. Accordingly, a lifespan of the brake apparatus 10 may be limited by lifespans of the first and fourth outlet valves 43 and 54.

The brake apparatus 10 may distribute the stress due to the opening and closing of the valves to all the outlet valves 43, 44, 53 and 54, and thereby may increase the lifespan of the brake apparatus 10 as a whole.

FIG. 8 illustrates another example of opening and closing of outlet valves included in operations for regenerative braking in a brake apparatus according to an embodiment.

As shown in FIG. 8, the controller 130 may open and then close the first outlet valve 43 of the first hydraulic circuit 40 and the fourth outlet valve 54 of the second hydraulic circuit 50 in the braking mode ①, and the controller 130 may open and then close the second outlet valve 44 of the first hydraulic circuit 40 and the third outlet valve 53 of the second hydraulic circuit 50 in the braking mode ⑤.

That is, the controller 130 may open and then close the outlet valves 43 and 54 connected to the front wheels 5FL and 5FR in the braking mode ①, and open and then close the outlet valves 44 and 53 connected to the rear wheels 5RR and 5RL in the braking mode ⑤.

Due to the opening of the first outlet valve 43 of the first hydraulic circuit 40 and the fourth outlet valve 54 of the second hydraulic circuit 50 in the braking mode ①, the pressure of every wheel cylinder 31, 32, 33 and 34 may be reduced. Also, due to the opening of the second outlet valve 44 of the first hydraulic circuit 40 and the third outlet valve 53 of the second hydraulic circuit 50 in the braking mode ⑤, the brake oil of all the wheel cylinders 31, 32, 33 and 34 may be recovered.

As described above, the brake apparatus 10 may alternately open and close the outlet valves different from each other in different braking modes during a same braking operation, and thereby may distribute the stress due to the opening and closing to the outlet valves 43, 44, 53 and 54. Accordingly, a lifespan of the brake apparatus 10 may be increased as a whole.

FIG. 9 illustrates still another example of opening and closing of outlet valves included in operations for regenerative braking in a brake apparatus according to an embodiment.

As shown in FIG. 9, the controller 130 may open and then close the first outlet valve 43 of the first hydraulic circuit 40 and the fourth outlet valve 54 of the second hydraulic circuit 50 in the braking modes ① and ⑤ during a first braking operation. Also, in the braking modes ① and ⑤ during a second braking operation, the controller 130 may open and then close the second outlet valve 44 of the first hydraulic circuit 40 and the third outlet valve 53 of the second hydraulic circuit 50.

That is, the controller 130 may open and then close the outlet valves 43 and 54 connected to the front wheels 5FL and 5FR in the braking modes ① and ⑤ during the first braking operation, and open and then close the outlet valves 44 and 53 connected to the rear wheels 5RR and 5RL in the braking modes ① and ⑤ during the second braking operation.

As described above, the brake apparatus 10 may alternately open and close the outlet valves different from each other during different braking operations, and thereby may distribute the stress due to the opening and closing to the outlet valves 43, 44, 53 and 54. Accordingly, a lifespan of the brake apparatus 10 may be increased as a whole.

FIG. 10 illustrates yet another example of opening and closing of outlet valves included in operations for regenerative braking in a brake apparatus according to an embodiment.

As shown in FIG. 10, the controller 130 may open and then close the first outlet valve 43 of the first hydraulic circuit 40 and the fourth outlet valve 54 of the second hydraulic circuit 50 in the braking mode ① during the first braking operation. Also, in the braking mode ⑤ during the first braking operation, the controller 130 may open and then close the second outlet valve 44 of the first hydraulic circuit 40 and the third outlet valve 53 of the second hydraulic circuit 50.

Also, the controller 130 may open and then close the second outlet valve 44 of the first hydraulic circuit 40 and the third outlet valve 53 of the second hydraulic circuit 50 in the braking mode ① during the second braking operation. Also, in the braking mode ⑤ during the second braking operation, the controller 130 may open and then close the first outlet valve 43 of the first hydraulic circuit 40 and the fourth outlet valve 54 of the second hydraulic circuit 50.

That is, the controller 130 may open and then close the outlet valves 43 and 54 connected to the front wheels 5FL and 5FR in the braking mode ① during the first braking operation, and open and then close the outlet valves 44 and 53 connected to the rear wheels 5RR and 5RL in the braking mode ① during the second braking operation. Also, the controller 130 may open and then close the outlet valves 44 and 53 connected to the rear wheels 5RR and 5RL in the braking mode ⑤ during the first braking operation, and open and then close the outlet valves 43 and 54 connected to the front wheels 5FL and 5FR in the braking mode ⑤ during the second braking operation.

As described above, the brake apparatus 10 may alternately open and close the outlet valves different from each other in different braking modes during the same braking operation, and may alternately open and close the outlet valves different from each other during different braking operations. Accordingly, the brake apparatus 10 may distribute the stress due to the opening and closing to the outlet valves 43, 44, 53 and 54, and a lifespan of the brake apparatus 10 may be increased as a whole.

FIG. 11 illustrates other example of opening and closing of outlet valves included in operations for regenerative braking in a brake apparatus according to an embodiment.

As shown in FIG. 11, the controller 130 may open and then close the first outlet valve 43 of the first hydraulic circuit 40 and the third outlet valve 53 of the second hydraulic circuit 50 in the braking mode ①, and the controller 130 may open and then close the second outlet valve 44 of the first hydraulic circuit 40 and the fourth outlet valve 54 of the second hydraulic circuit 50 in the braking mode ⑤.

That is, the controller 130 may open and then close the outlet valves 43 and 53 connected to the left wheels 5FL and 5RL in the braking mode ①, and open and then close the outlet valves 44 and 54 connected to the right wheels 5RR and 5FR in the braking mode ⑤.

Due to the opening of the first outlet valve 43 of the first hydraulic circuit 40 and the third outlet valve 53 of the second hydraulic circuit 50 in the braking mode ①, all the pressure of every wheel cylinder 31, 32, 33 and 34 may be reduced. Also, due to the opening of the second outlet valve 44 of the first hydraulic circuit 40 and the fourth outlet valve 54 of the second hydraulic circuit 50 in the braking mode ⑤, the brake oil of all the wheel cylinders 31, 32, 33 and 34 may be recovered.

As described above, the brake apparatus 10 may alternately open and close the outlet valves different from each other in different braking modes during the same braking operation, and thereby may distribute the stress due to the opening and closing to the outlet valves 43, 44, 53 and 54. Accordingly, a lifespan of the brake apparatus 10 may be increased as a whole.

FIG. 12 illustrates other example of opening and closing of outlet valves included in operations for regenerative braking in a brake apparatus according to an embodiment.

As shown in FIG. 12, the controller 130 may open and then close the first outlet valve 43 of the first hydraulic circuit 40 and the third outlet valve 53 of the second hydraulic circuit 50 in the braking modes ① and √5 during the first braking operation. Also, in the braking modes ① and ⑤ during the second braking operation, the controller 130 may open and then close the second outlet valve 44 of the first hydraulic circuit 40 and the fourth outlet valve 54 of the second hydraulic circuit 50.

That is, the controller 130 may open and then close the outlet valves 43 and 53 connected to the left wheels 5FL and 5RL in the braking modes ① and ⑤ during the first braking operation, and open and then close the outlet valves 44 and 54 connected to the right wheels 5RR and 5FR in the braking modes ① and ⑤ during the second braking operation.

As described above, the brake apparatus 10 may alternately open and close the outlet valves different from each other during different braking operations, and thereby may distribute the stress due to the opening and closing to the outlet valves 43, 44, 53 and 54. Accordingly, a lifespan of the brake apparatus 10 may be increased as a whole.

FIG. 13 illustrates other example of opening and closing of outlet valves included in operations for regenerative braking in a brake apparatus according to an embodiment.

As shown in FIG. 13, the controller 130 may open and then close the first outlet valve 43 of the first hydraulic circuit 40 and the third outlet valve 53 of the second hydraulic circuit 50 in the braking mode ① during the first braking operation. Also, in the braking mode ⑤ during the first braking operation, the controller 130 may open and then close the second outlet valve 44 of the first hydraulic circuit 40 and the fourth outlet valve 54 of the second hydraulic circuit 50.

Also, the controller 130 may open and then close the second outlet valve 44 of the first hydraulic circuit 40 and the fourth outlet valve 54 of the second hydraulic circuit 50 in the braking mode ① during the second braking operation. Also, in the braking mode ⑤ during the second braking operation, the controller 130 may open and then close the first outlet valve 43 of the first hydraulic circuit 40 and the third outlet valve 53 of the second hydraulic circuit 50.

That is, the controller 130 may open and then close the outlet valves 43 and 53 connected to the left wheels 5FL and 5RL in the braking mode ① during the first braking operation, and open and then close the outlet valves 44 and 54 connected to the right wheels 5RR and 5FR in the braking mode ① during the second braking operation. Also, the controller 130 may open and then close the outlet valves 44 and 54 connected to the right wheels 5RR and 5FR in the braking mode ⑤ during the first braking operation, and open and then close the outlet valves 43 and 53 connected to the left wheels 5FL and 5RL in the braking mode ⑤ during the second braking operation.

As described above, the brake apparatus 10 may alternately open and close the outlet valves different from each other in different braking modes during the same braking operation, and may alternately open and close the outlet valves different from each other during different braking operations. Accordingly, the brake apparatus 10 may distribute the stress due to the opening and closing to the outlet valves 43, 44, 53 and 54, and a lifespan of the brake apparatus 10 may be increased as a whole.

Meanwhile, the disclosed embodiments may be embodied in the form of recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

Although embodiments of the disclosure have been described with reference to the accompanying drawings, a person having ordinary skilled in the art will appreciate that other specific modifications may be easily made without departing from the technical spirit or essential features of the disclosure. Therefore, the foregoing embodiments should be regarded as illustrative rather than limiting in all aspects.

The invention claimed is:
1. A brake apparatus, comprising:
a first wheel cylinder provided in a first wheel;
a second wheel cylinder provided in a second wheel;
a first outlet valve configured to control a discharge of brake oil from the first wheel cylinder;
a second outlet valve configured to control a discharge of brake oil from the second wheel cylinder; and
a controller configured to control the first outlet valve and the second outlet valve, wherein the first outlet valve and the second outlet valve are changeable to a closed state or an open state according to the controller's control, wherein the controller configured to control to change one outlet valve of the first outlet valve and the second outlet valve from the closed state to the open state and then from the open state to the closed state, while maintaining an other outlet valve of the first outlet valve and the second outlet valve in the closed state, in response to a first braking command where a brake pedal deviates from a reference position, and to control to change the other outlet valve of the first outlet valve and the second outlet valve from the closed state to the open state and then from the open state to the closed state, while maintaining the one outlet valve of the first outlet vale and the second outlet valve in the closed state, in response to a first braking stop command where the brake pedal is returned to the reference position.

2. The brake apparatus of claim 1, wherein the controller is configured to open the one outlet valve, when a braking force of regenerative braking determined based on a rotational speed of the first wheel and the second wheel is greater than a predetermined value.

3. The brake apparatus of claim 2, wherein the controller is configured to close the one outlet valve, when the braking force of regenerative braking reaches a maximum regenerative braking force.

4. The brake apparatus of claim 3, further comprising:
a pump configured to pump the brake oil to the first wheel cylinder and the second wheel cylinder,
wherein the controller is configured to operate the pump, when the braking force of regenerative braking decreases.

5. The brake apparatus of claim 4, wherein the controller is configured to open the other outlet valve, when the first braking stop command where the brake pedal is returned to the reference position is detected.

6. The brake apparatus of claim 5, wherein the controller is configured to open the other outlet valve, when a second braking command where the brake pedal moves from the reference position is detected.

7. The brake apparatus of claim 6, wherein the controller is configured to open the one outlet valve, when a second braking stop command where the brake pedal is returned to the reference position is detected.

8. A control method of a brake apparatus comprising first and second wheel cylinders provided in first and second wheels, respectively, and first and second outlet valves, changeable to a closed state or an open state, configured to control a discharge of brake oil from the first and second wheel cylinders, the control method comprising:

controlling to change one outlet valve of the first outlet valve and the second outlet valve from the closed state to the open state and then from the open state to the closed state, while maintaining an other outlet valve of the first outlet valve and the second outlet valve in the closed state, in response to a first braking command where a brake pedal deviates from a reference position; and controlling to change an other outlet valve of the first outlet valve and the second outlet valve from the closed state to the open state and then from the open state to the closed state, while maintaining the one outlet valve of the first outlet vale and the second outlet valve in the closed state, in response to a first braking stop command where the brake pedal is returned to the reference position.

9. The control method of claim 8, wherein the opening and then closing of the one outlet valve comprises opening the one outlet valve, when a braking force of regenerative braking determined based on a rotational speed of the first wheel and the second wheel is greater than a predetermined value.

10. The control method of claim 9, wherein the opening and then closing of the one outlet valve further comprises closing the one outlet valve, when the braking force of regenerative braking reaches a maximum regenerative braking force.

11. The control method of claim 10, wherein the opening and then closing of the one outlet valve further comprises operating a pump that pumps the brake oil to the first wheel cylinder and the second wheel cylinder, when the braking force of regenerative braking decreases.

12. The control method of claim 11, wherein the opening and then closing of the other outlet valve comprises opening the other outlet valve, when the first braking stop command where the brake pedal is returned to the reference position is detected.

13. The control method of claim 12, further comprising:
opening the other outlet valve, when a second braking command where the brake pedal moves from the reference position is detected.

14. The control method of claim 13, further comprising:
opening the one outlet valve, when a second braking stop command where the brake pedal is returned to the reference position is detected.

15. A brake apparatus, comprising:
a first wheel cylinder provided in a first wheel;
a second wheel cylinder provided in a second wheel;
a first outlet valve configured to control a discharge of brake oil from the first wheel cylinder;
a second outlet valve configured to control a discharge of brake oil from the second wheel cylinder; and
a controller configured to control the first outlet valve and the second outlet valve,
wherein the first outlet valve and the second outlet valve are changeable to a closed state or an open state according to the controller's control,
wherein the controller configured
to control to change one outlet valve of the first outlet valve and the second outlet valve from the closed state to the open state and then from the open state to the closed state, while maintaining an other outlet valve of the first outlet valve and the second outlet valve in the closed state, in response to a first braking command where a brake pedal deviates from a reference position, and
when a second braking command where the brake pedal deviates from the reference position again is detected after the first braking command, to control to change the other outlet valve of the first outlet valve and the second outlet valve from the closed state to the open state and then from the open state to the closed state, while maintaining the one outlet valve of the first outlet vale and the second outlet valve in the closed state.

16. The brake apparatus of claim 15, wherein the controller is configured to open and then close the one outlet valve in response to a first braking stop command where the brake pedal is returned to the reference position after the first braking command, and open and then close the other outlet valve in response to a second braking stop command where the brake pedal is returned to the reference position after the second braking command.

17. The brake apparatus of claim 15, wherein the controller is configured to open and then close the other outlet valve in response to a first braking stop command where the brake pedal is returned to the reference position after the first braking command, and open and then close the one outlet valve in response to a second braking stop command where the brake pedal is returned to the reference position after the second braking command.

* * * * *